US010913622B2

(12) United States Patent
Stott et al.

(10) Patent No.: US 10,913,622 B2
(45) Date of Patent: Feb. 9, 2021

(54) SYSTEMS AND METHODS FOR PROVIDING A TRACK FOR AN INDUSTRIAL CART

(71) Applicant: Grow Solutions Tech LLC, Lehi, UT (US)

(72) Inventors: Mark Gerald Stott, Eagle Mountain, UT (US); Gary Bret Millar, Highland, UT (US); Todd Garrett Tueller, American Fork, UT (US); Michael Stephen Hurst, Farmington, UT (US); Alan Ray Bentley, Alpine, UT (US); Taylor John Woodbury, Provo, UT (US)

(73) Assignee: GROW SOLUTIONS TECH LLC, Vineyard, UT (US)

( * ) Notice: Subject to any disclaimer, the term of this patent is extended or adjusted under 35 U.S.C. 154(b) by 429 days.

(21) Appl. No.: 15/902,564

(22) Filed: Feb. 22, 2018

(65) Prior Publication Data

US 2018/0362272 A1    Dec. 20, 2018

Related U.S. Application Data

(60) Provisional application No. 62/519,313, filed on Jun. 14, 2017, provisional application No. 62/519,326, (Continued)

(51) Int. Cl.
*B65G 67/22*    (2006.01)
*B62B 5/00*    (2006.01)
(Continued)

(52) U.S. Cl.
CPC ............. *B65G 67/22* (2013.01); *B60M 1/302* (2013.01); *B60M 1/36* (2013.01); *B61B 13/02* (2013.01);
(Continued)

(58) Field of Classification Search
CPC ......... B65G 67/22; B60M 1/302; B60M 1/36; B61B 13/02; A01G 9/143
See application file for complete search history.

(56) References Cited

U.S. PATENT DOCUMENTS 5,392,987 A * 2/1995 Ropers ................... A63H 19/36
                                                                104/111
8,776,970 B2 * 7/2014 Asplund ................... B60L 5/40
                                                                191/29 R
(Continued)

FOREIGN PATENT DOCUMENTS

CN    205468615 U    8/2016
CN    106005932 A    10/2016
(Continued)

*Primary Examiner* — Jason C Smith
(74) *Attorney, Agent, or Firm* — Dinsmore & Shohl LLP

(57) ABSTRACT

A track system for a cart includes a plurality of curved modular track sections for the cart. Each of the plurality of curved modular track sections includes one or more rails configured to engage with the cart on the track, and one or more reservoir sections configured to receive liquid from the cart. Each of the plurality of curved modular track is tilted relative to ground by a predetermined angle such that the one or more reservoir sections are configured to direct the liquid to a predetermined area. Each of the plurality of curved modular track sections includes a gear system configured to engage with a gear of the cart.

18 Claims, 7 Drawing Sheets

Related U.S. Application Data filed on Jun. 14, 2017, provisional application No. 62/519,304, filed on Jun. 14, 2017.

(51) Int. Cl.
  *B60M 1/36* (2006.01)
  *B60M 1/30* (2006.01)
  *B61B 13/02* (2006.01)
  *B60P 1/02* (2006.01)
  *A01G 9/14* (2006.01)

(52) U.S. Cl.
  CPC ............ *B62B 5/0076* (2013.01); *A01G 9/143* (2013.01); *B60P 1/02* (2013.01)

(56) References Cited

U.S. PATENT DOCUMENTS

| | | | |
|---|---|---|---|
| 9,139,207 B2* | 9/2015 | Benish | B60L 5/38 |
| 9,533,632 B2* | 1/2017 | Bangtsson | B60R 16/02 |
| 9,687,883 B2* | 6/2017 | Hayduchok | B07C 3/087 |
| 2006/0011093 A1* | 1/2006 | Jensen | B60L 13/04 |
| | | | 104/282 |
| 2018/0359940 A1* | 12/2018 | Millar | B61L 23/34 |
| 2018/0359947 A1* | 12/2018 | Millar | A01G 31/042 |
| 2018/0362272 A1* | 12/2018 | Stott | B62B 5/0076 |
| 2020/0039755 A1* | 2/2020 | Millar | B65G 45/22 |

FOREIGN PATENT DOCUMENTS

| | | | | |
|---|---|---|---|---|
| JP | H05330608 A | 12/1993 | | |
| JP | 2010095249 A | 4/2010 | | |
| WO | 2002098699 A1 | 12/2002 | | |
| WO | WO-2015170982 A1 * | 11/2015 | ............ | B65G 21/22 |

* cited by examiner

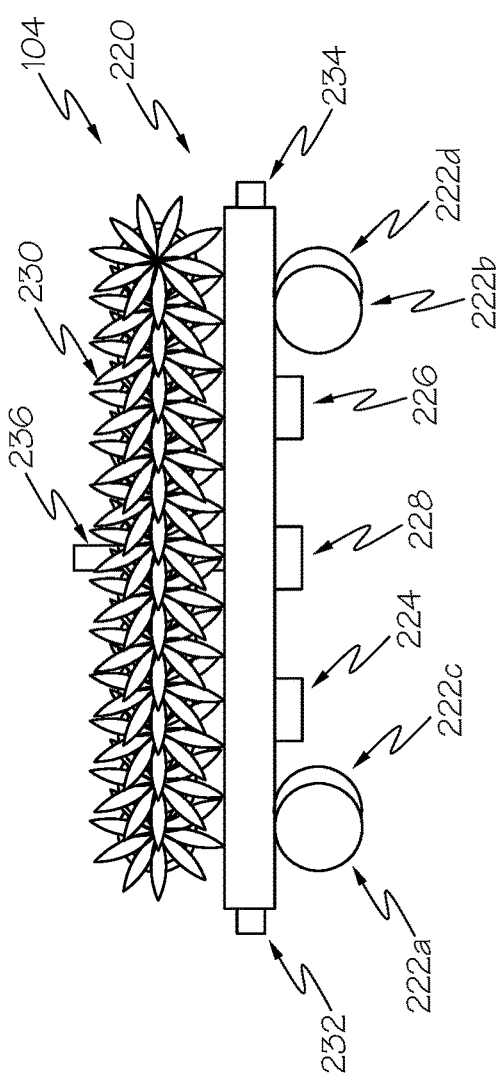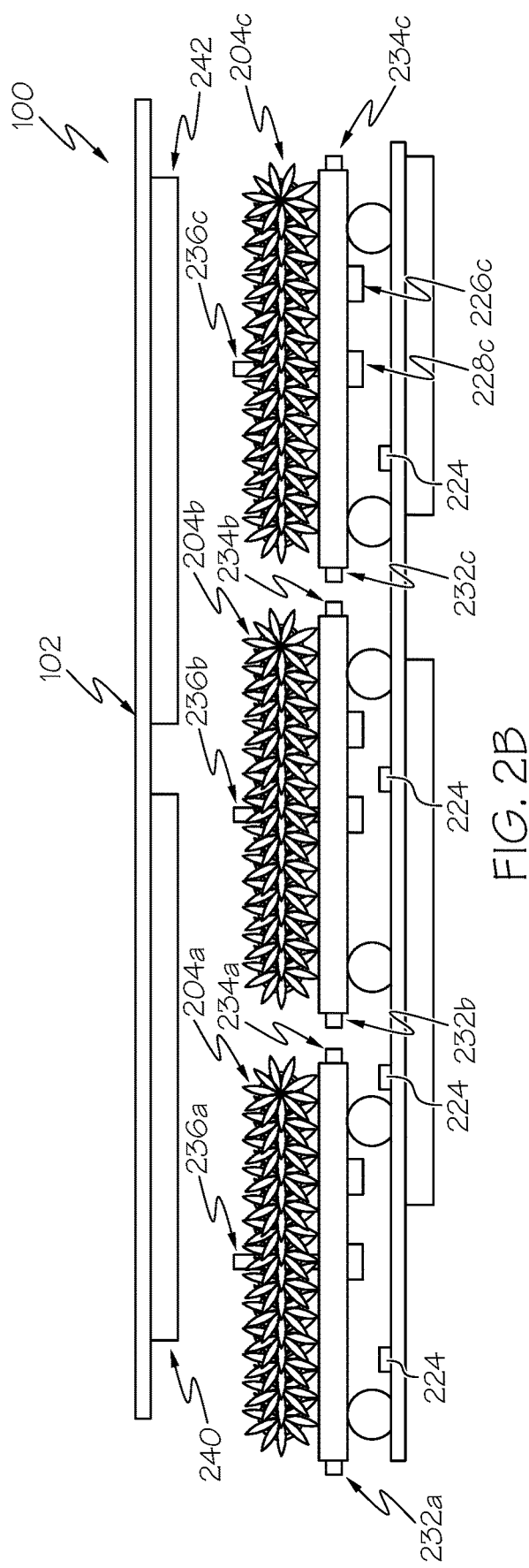

SYSTEMS AND METHODS FOR PROVIDING A TRACK FOR AN INDUSTRIAL CART

CROSS REFERENCE TO RELATED APPLICATIONS

This application the benefit of U.S. Provisional Patent Application Nos. 62/519,313, 62/519,326, and 62/519,304 all filed on Jun. 14, 2017, the entire contents of which are herein incorporated by reference.

TECHNICAL FIELD

Embodiments described herein generally relate to systems and methods for providing a track for an industrial cart and, more specifically, to a track that provides water disposal, shavings disposal, and a gear-based system of propelling a cart.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food.

Additionally, whether part of a grow pod or other industrial cart; industrial carts currently have no way to efficiently dispose of waste. Additionally, current solutions do not utilize a gear system to propel a cart.

SUMMARY

In one embodiment, a track system for a cart includes a plurality of curved modular track sections for the cart. Each of the plurality of curved modular track sections includes one or more rails configured to engage with the cart on the track, and one or more reservoir sections configured to receive liquid from the cart. Each of the plurality of curved modular track sections is tilted relative to ground by a predetermined angle such that the one or more reservoir sections are configured to direct the liquid to a predetermined area.

In another embodiment, a method for providing a track for a cart includes providing the track for the cart by coupling a plurality of curved modular track sections, engaging the track with the cart, receiving, by one or more reservoir sections of the track, liquid from the cart, and directing the liquid to a predetermined area. Each of the plurality of curved modular track is tilted relative to ground by a predetermined angle such that the one or more reservoir sections are configured to direct the liquid to a predetermined area.

In another embodiment, a track system for a cart includes a plurality of modular track sections. Each of the modular track sections includes one or more rails configured to engage with the cart, a gear system configured to engage with a gear of the cart, and connection mechanisms configured to couple with connection mechanisms of another modular track section. At least one of the plurality of modular track sections is tilted relative to ground by a predetermined angle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 2A depicts an industrial cart for coupling to a track, according to embodiments described herein;

FIG. 2B depicts a plurality of industrial carts in an assembly line configuration, according to embodiments described herein;

DETAILED DESCRIPTION

Embodiments disclosed herein include systems and methods for providing a track for an industrial cart. In embodiments, a track system for an industrial cart includes a plurality of curved modular track sections for the cart. Each of the plurality of curved modular track sections includes one or more rails configured to engage with the cart on the track, and one or more reservoir sections configured to receive liquid from the cart. Each of the plurality of curved modular track is tilted relative to ground by a predetermined angle such that the one or more reservoir sections are configured to direct the liquid to a predetermined area. The systems and methods for providing a track for an industrial cart incorporating the same will be described in more detail, below.

Figure 1:
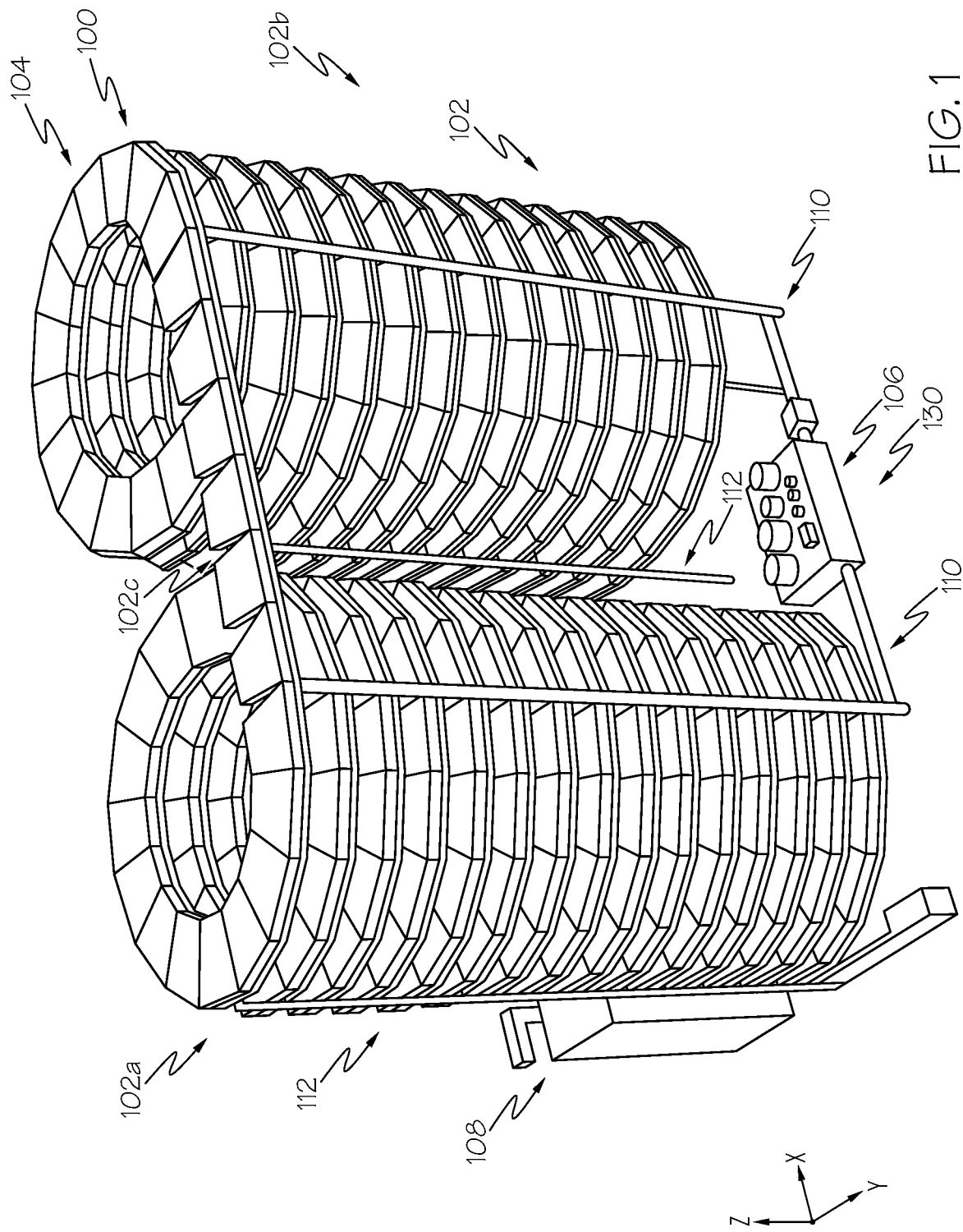
FIG. 1 depicts an assembly line grow pod that includes a transportation trail for an industrial cart, according to embodiments described herein.

Referring now to the drawings, FIG. 1 depicts an assembly line grow pod 100 that receives a plurality of industrial carts 104, according to embodiments described herein. The assembly line grow pod 100 may be positioned on an x-y plane as shown in FIG. 1. As illustrated, the assembly line grow pod 100 may include a track 102 that holds one or more industrial carts 104. Each of the one or more industrial carts 104, as described in more detail with reference to FIGS. 2A and 2B, may include one or more wheels 222a, 222b, 222c, and 222d rotatably coupled to the industrial cart 104 and supported on the track 102, as described in more detail with reference to FIGS. 3A and 3B.

Additionally, a drive motor is coupled to the industrial cart 104. In some embodiments, the drive motor may be coupled to at least one of the one or more wheels 222a, 222b, 222c, and 222d such that the industrial cart 104 may be propelled along the track 102 in response to a signal transmitted to the drive motor. In other embodiments, the drive motor may be rotatably coupled to the track 102. For example, without limitation, the drive motor may be rotatably coupled to the track 102 through one or more gears which engage a plurality of teeth arranged along the track 102 such that the industrial cart 104 may be propelled along the track 102.

Figure 3A:
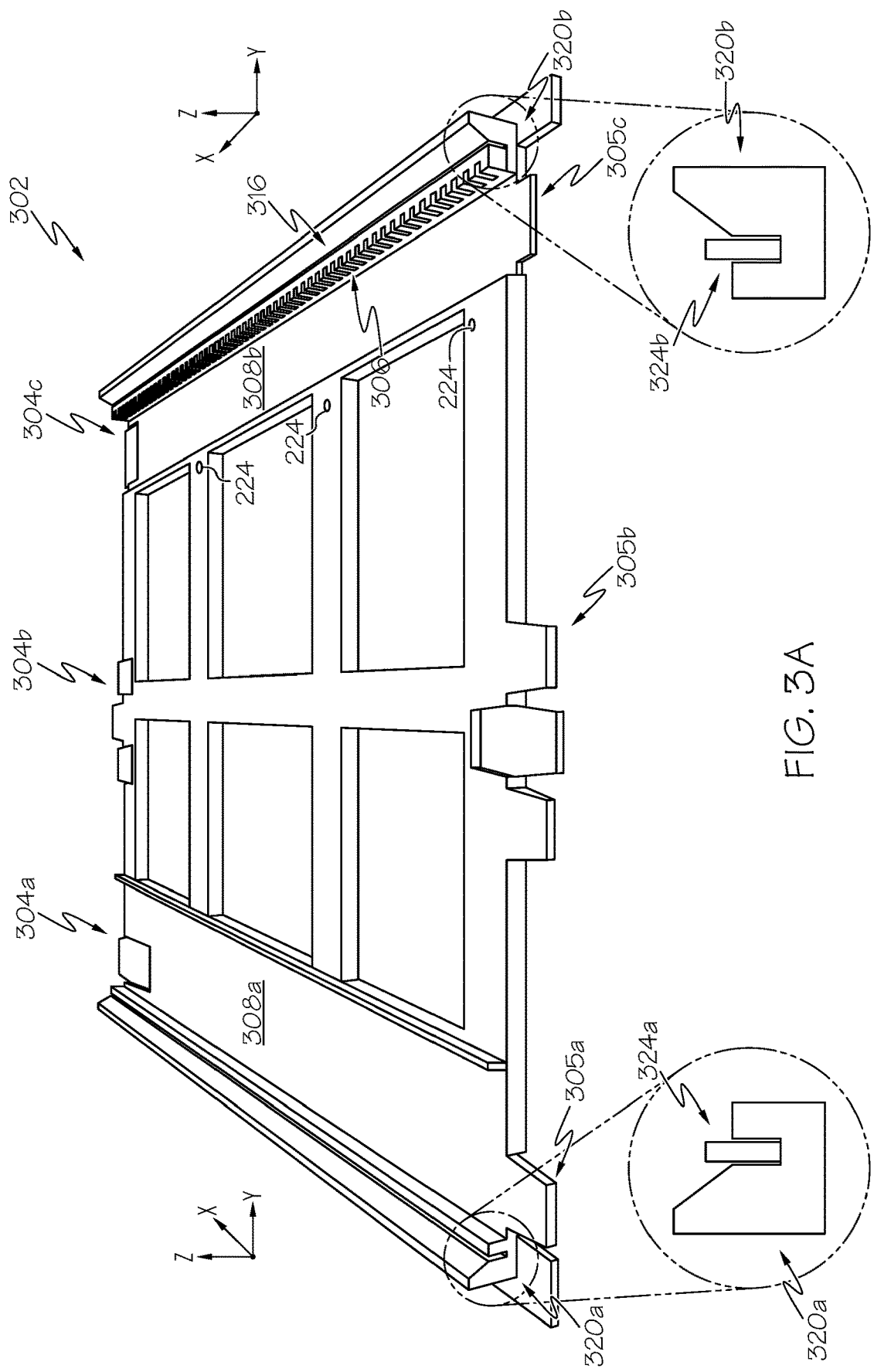
FIG. 3A depicts a perspective view of a straight modular track for an industrial cart, according to embodiments described herein.
Figure 3B:
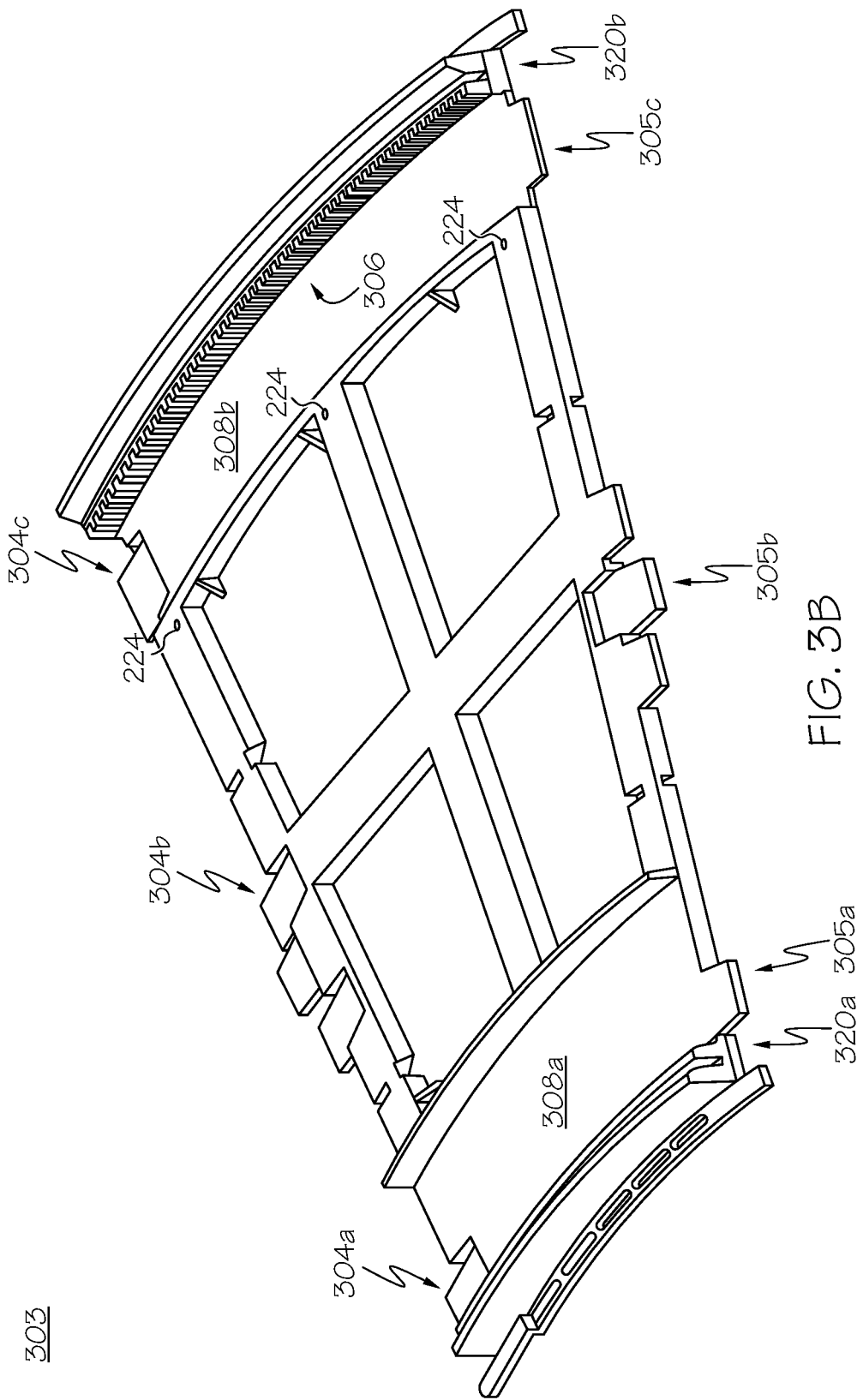
FIG. 3B depicts a perspective view of a curved modular track for an industrial cart, according to embodiments described herein.

The track 102 may consist of a plurality of modular track sections. The plurality of modular track sections may include a plurality of straight modular track sections as shown in FIG. 3A and a plurality of curved modular track sections as shown in FIG. 3B. The track 102 may include an ascending portion 102a, a descending portion 102b, and a connection portion 102c. The ascending portion 102a and the descending portions 102b may include the plurality of curved modular track sections. The ascending portion 102a may wrap around (e.g., in a counterclockwise direction as depicted in FIG. 1) a first axis such that the industrial carts 104 ascend upward in a vertical direction. The first axis may be parallel to the z axis as shown in FIG. 1 (i.e., perpendicular to the x-y plane). The plurality of curved modular track sections of the ascending portion 102a may be tilted relative to the x-y plane (i.e., the ground) by a predetermined angle.

The descending portion 102b may be wrapped around a second axis (e.g., in a counterclockwise direction as depicted in FIG. 1) that is substantially parallel to the first axis, such that the industrial carts 104 may be returned closer to ground level. The plurality of curved modular track sections of the descending portion 102b may be tilted relative to the x-y plane (i.e., the ground) by a predetermined angle.

The connection portion 102c may include a plurality of straight modular track sections. The connection portion 102c may be relatively level with respect to the x-y plane (although this is not a requirement) and is utilized to transfer the industrial carts 104 from the ascending portion 102a to the descending portion 102b. In some embodiments, a second connection portion (not shown in FIG. 1) may be positioned near ground level that couples the descending portion 102b to the ascending portion 102a such that the industrial carts 104 may be transferred from the descending portion 102b to the ascending portion 102a. The second connection portion may include a plurality of straight modular track sections.

In some embodiments, the track 102 may include two or more parallel rails that support the industrial cart 104 via the one or more wheels 222a, 222b, 222c, and 222d rotatably coupled thereto. In some embodiments, at least two of the parallel rails of the track 102 are electrically conductive, thus capable of transmitting communication signals and/or power to and from the industrial cart 104, for example, as depicted in FIG. 2B. In yet other embodiments, a portion of the track 102 is electrically conductive and a portion of the one or more wheels 222a, 222b, 222c, and 222d are in electrical contact with the portion of the track 102 which is electrically conductive. In some embodiments, the track 102 may be segmented into more than one electrical circuit. That is, the electrically conductive portion of the track 102 may be segmented with a non-conductive section such that a first electrically conductive portion of the track 102 is electrically isolated from a second electrically conductive portion of the track 102 which is adjacent to the first electrically conductive portion of the track 102.

The communication signals and power may further be received and/or transmitted via the one or more wheels 222a, 222b, 222c, and 222d of the industrial cart 104 and to and from various components of industrial cart 104, as described in more detail herein. Various components of the industrial cart 104, as described in more detail herein, may include the drive motor, the control device, and one or more sensors.

In some embodiments, the communication signals and power signals may include an encoded address specific to an industrial cart 104 and each industrial cart 104 may include a unique address such that multiple communication signals and power may be transmitted over the same track 102 and received and/or executed by their intended recipient. For example, the assembly line grow pod 100 system may implement a digital command control system (DCC). DDC systems encode a digital packet having a command and an address of an intended recipient, for example, in the form of a pulse width modulated signal that is transmitted along with power to the track 102.

In such a system, each industrial cart 104 includes a decoder, which may be the control device coupled to the industrial cart 104, designated with a unique address. When the decoder receives a digital packet corresponding to its unique address, the decoder executes the embedded command. In some embodiments, the industrial cart 104 may also include an encoder, which may be the control device coupled to the industrial cart 104, for generating and transmitting communications signals from the industrial cart 104, thereby enabling the industrial cart 104 to communicate with other industrial carts 104 positioned along the track 102 and/or other systems or computing devices communicatively coupled with the track 102.

While the implementation of a DCC system is disclosed herein as an example of providing communication signals along with power to a designated recipient along a common interface (e.g., the track 102) any system and method capable of transmitting communication signals along with power to and from a specified recipient may be implemented. For example, in some embodiments, digital data may be transmitted over AC circuits by utilizing a zero-cross, step, and/or other communication protocol.

Additionally, while not explicitly illustrated in FIG. 1, the assembly line grow pod 100 may also include a harvesting component, a tray washing component, and other systems and components coupled to and/or in-line with the track 102. In some embodiments, the assembly line grow pod 100 may include a plurality of lighting devices, such as light emitting diodes (LEDs). The lighting devices may be disposed on the track 102 opposite the industrial carts 104, such that the lighting devices direct light waves to the industrial carts 104 on the portion the track 102 directly below. In some embodiments, the lighting devices are configured to create a plurality of different colors and/or wavelengths of light, depending on the application, the type of plant being grown, and/or other factors. While in some embodiments, LEDs are utilized for this purpose, this is not a requirement. Any lighting device that produces low heat and provides the desired functionality may be utilized.

Also depicted in FIG. 1 is a master controller 106. The master controller 106 may include a computing device 130, a nutrient dosing component, a water distribution component, and/or other hardware for controlling various components of the assembly line grow pod 100. In some embodiments, the master controller 106 and/or the computing device 130 are communicatively coupled to a network 550 (as depicted and further described with reference to FIG. 5).

Coupled to the master controller 106 is a seeder component 108. The seeder component 108 may be configured to seed one or more industrial carts 104 as the industrial carts 104 pass the seeder in the assembly line. Depending on the particular embodiment, each industrial cart 104 may include a single section tray for receiving a plurality of seeds. Some embodiments may include a multiple section tray for receiving individual seeds in each section (or cell). In the embodiments with a single section tray, the seeder component 108 may detect presence of the respective industrial cart 104 and may begin laying seed across an area of the single section tray. The seed may be laid out according to a desired depth of seed, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged.

In the embodiments where a multiple section tray is utilized with one or more of the industrial carts 104, the seeder component 108 may be configured to individually insert seeds into one or more of the sections of the tray. Again, the seeds may be distributed on the tray (or into individual cells) according to a desired number of seeds, a desired area the seeds should cover, a desired depth of seeds, etc.

The watering component may be coupled to one or more water lines 110, which distribute water and/or nutrients to one or more trays at predetermined areas of the assembly line grow pod 100. In some embodiments, seeds may be sprayed to reduce buoyancy and then flooded. Additionally, water usage and consumption may be monitored, such that at subsequent watering stations, this data may be utilized to determine an amount of water to apply to a seed at that time.

Also depicted in FIG. 1 are airflow lines 112. Specifically, the master controller 106 may include and/or be coupled to one or more components that delivers airflow for temperature control, humidity control, pressure control, carbon dioxide control, oxygen control, nitrogen control, etc. Accordingly, the airflow lines 112 may distribute the airflow at predetermined areas in the assembly line grow pod 100.

It should be understood that while some embodiments of the track may be configured for use with a grow pod, such as that depicted in FIG. 1, this is merely an example. The track and track communications are not so limited and can be utilized for any track system where communication is desired.

FIG. 2A depicts an industrial cart 104 that may be utilized for the assembly line grow pod 100, according to embodiments described herein. As illustrated, the industrial cart 104 includes a tray section 220 and one or more wheels 222a, 222b, 222c, and 222d. The one or more wheels 222a, 222b, 222c, and 222d may be configured to rotatably couple with the track 102, as well as receive power, from the track 102. The track 102 may additionally be configured to facilitate communication with the industrial cart 104 through the one or more wheels 222a, 222b, 222c, and 222d.

In some embodiments, one or more components may be coupled to the tray section 220. For example, a drive motor 226, a cart computing device 228, and/or a payload 230 may be coupled to the tray section 220 of the industrial cart 104. The tray section 220 may additionally include a payload 230. Depending on the particular embodiment, the payload 230 may be configured as plants (such as in an assembly line grow pod 100); however this is not a requirement, as any payload 230 may be utilized.

The drive motor 226 may be configured as an electric motor and/or any device capable of propelling the industrial cart 104 along the track 102. For example, without limitation, the drive motor 226 may be configured as a stepper motor, an alternating current (AC) or direct current (DC) brushless motor, a DC brushed motor, or the like. In some embodiments, the drive motor 226 may comprise electronic circuitry which may adjust the operation of the drive motor 226 in response to a communication signal (e.g., a command or control signal) transmitted to and received by the drive motor 226. The drive motor 226 may be coupled to the tray section 220 of the industrial cart 104 or directly coupled to the industrial cart 104.

In some embodiments, more than one drive motor 226 may be included on an industrial cart 104. For example, each wheel 222a, 222b, 222c, and 222d may be rotatably coupled to a drive motor 226. In other embodiments, the drive motor 226 may be rotatably coupled through gears and/or belts to an axle which is rotatably coupled to one or more wheels 222a, 222b, 222c, and 222d. Furthermore, in some embodiments, the drive motor 226 is electrically coupled to the cart computing device 228.

The cart computing device 228 may electrically monitor and control the speed, direction, torque, shaft rotation angle, or the like either directly and/or via a sensor that monitors operation of the drive motor 226. In some embodiments, the cart computing device 228 may electrically control the operation of the drive motor 226. In still some embodiments, the cart computing device 228 receives a communication signal transmitted through the electrically conductive track 102 and the one or more wheels 222a, 222b, 222c, and 222d from the master controller 106 or other computing device communicatively coupled to the track 102.

In some embodiments, the cart computing device 228 may control the drive motor 226 in response to a leading sensor 232, a trailing sensor 234, and/or an orthogonal sensor 236 included on the industrial cart 104. Each of the leading sensor 232, the trailing sensor 234, and the orthogonal sensor 236 may comprise an infrared sensor, visual light sensor, an ultrasonic sensor, a pressure sensor, a proximity sensor, a motion sensor, a contact sensor, an image sensor, an inductive sensor (e.g., a magnetometer) or other type of sensor capable of detecting at least the presence of an object (e.g., another industrial cart 104 or a location marker 224, FIG. 2B) and generating one or more signals indicative of the detected event (e.g., the presence of the object).

As used herein, a "detected event" refers to an event for which the sensor is configured to generate one or more signals in response. For example, if the sensor is configured to generate one or more signals in response to the detection of an object, the detected event may be the detection of an object. Moreover, if the sensor is configured to generate one or more signals in response to the distance from the sensor to an object then the detected event may be a distance value.

As another example, a detected event may be the detection, by an infrared sensor, of infrared light. In such an example, the infrared light may be originally generated by the infrared sensor and reflected off an object in the field of view of the infrared sensor or an infrared emitter may be coupled with the industrial cart 104 or in the environment of the assembly line grow pod 100 for generating infrared light which may be reflected off an object and detected by the infrared sensor. In some instances, the infrared sensor may be calibrated to generate a signal when the detected infrared light is above a defined threshold value (e.g., above a defined power level).

In some embodiments, a pattern (e.g. a barcode or QR code) may be represented in the reflected infrared light, which may be received by the infrared sensor and trigger the generation of one or more signals indicative of the pattern detected by the infrared sensor. The aforementioned is not limited to infrared light. Various wavelengths of light including visual light, such as red or blue, may also be emitted, reflected, and detected by a visual light sensor or an image sensor that generates one or more signals in response to the light detection. As an additional example, a detected event may be the detection, by a pressure sensor or a contact sensor, of contact with an object, such as another industrial cart 104.

In some embodiments, the leading sensor 232, the trailing sensor 234, and the orthogonal sensor 236 may be communicatively coupled to the cart computing device 228. The cart computing device 228 may receive the one or more signals from the leading sensor 232, the trailing sensor 234, and/or the orthogonal sensor 236 and in response to the one or more signals, execute a function defined in the operating logic 642, communication logic 544a and/or power logic 544b, which are described in more detail herein with reference to FIGS. 5 and 6. For example, in response to the one or more signals received by the cart computing device 228, the cart computing device 228 may adjust, either directly or through intermediate circuitry for example, an H-bridge or the like, the speed, direction, torque, shaft rotation angle, or the like of the drive motor 226.

Figure 5:
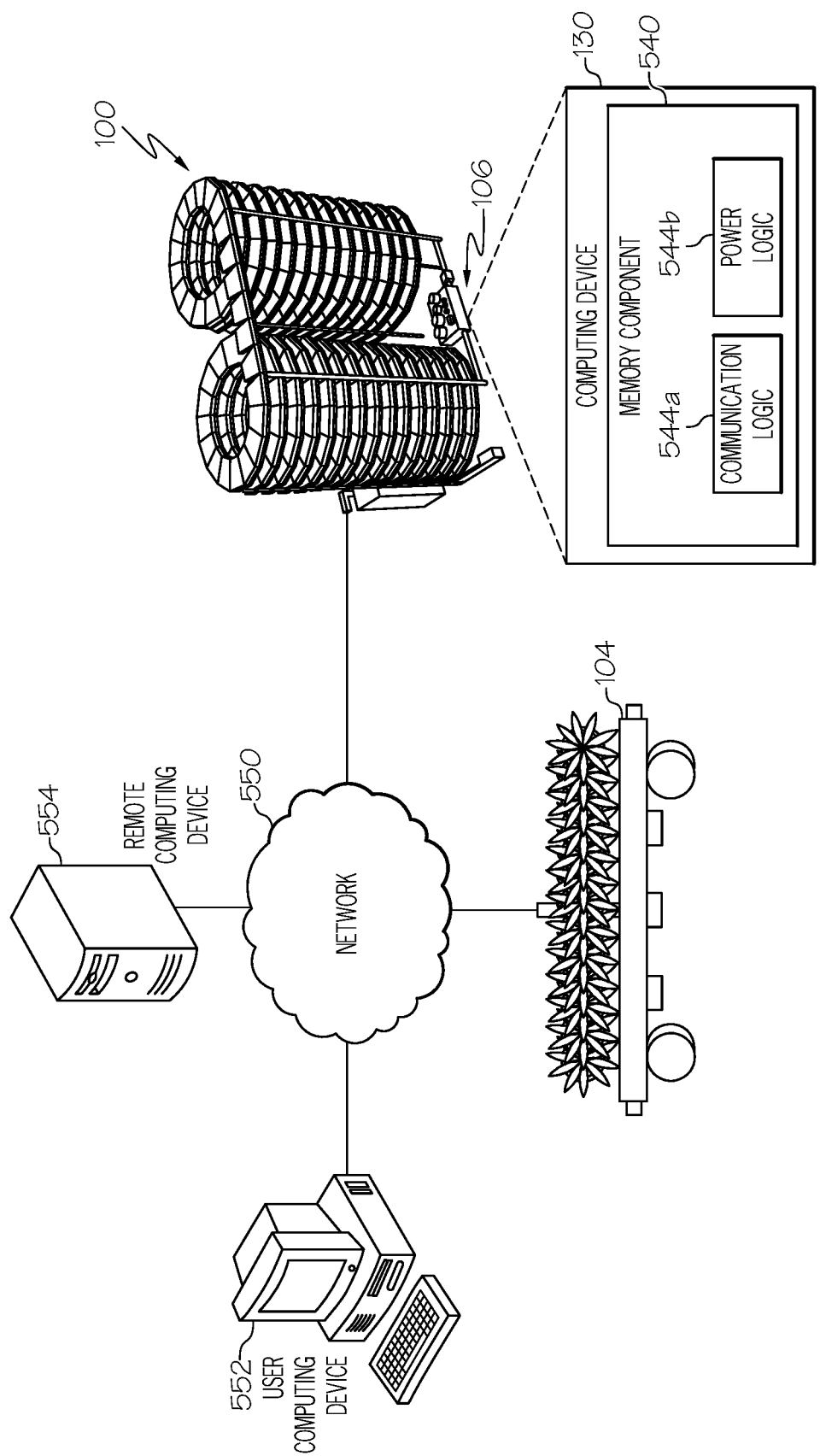
FIG. 5 depicts a computing environment for providing a transportation rail for an industrial cart, according to embodiments described herein.

In some embodiments, the leading sensor 232, the trailing sensor 234, and/or the orthogonal sensor 236 may be communicatively coupled to the master controller 106 (FIG. 1). In some embodiments, for example, the leading sensor 232, the trailing sensor 234, and the orthogonal sensor 236 may generate one or more signals that may be transmitted via the one or more wheels 222a, 222b, 222c, and 222d and the track 102 (FIG. 1). In some embodiments, the track 102 and/or the industrial cart 104 may be communicatively coupled to a network 550 (FIG. 5). Therefore, the one or more signals may be transmitted to the master controller 106 via the network 550 over network interface hardware 634 (FIG. 6) or the track 102 and in response, the master controller 106 may return a control signal to the drive motor 226 for controlling the operation of one or more drive motors 226 of one or more industrial carts 104 positioned on the track 102.

In further embodiments, the one or more signals from the leading sensor 232, the trailing sensor 234, and/or the orthogonal sensor 236 may directly adjust and control the drive motor 226. For example, power to the drive motor 226 may be electrically coupled with a field-effect transistor, relay or other similar electronic device capable of receiving one or more signals from a sensor, for example, a contact sensor, and adjusting the operation of the drive motor 226 in response to the one or more signals from the sensor. As an example, if a contact sensor electromechanically closes (i.e., the contact sensor contacts an object, such as another industrial cart 104), then the power to the drive motor 226 is terminated. Similarly, when the contact sensor electromechanically opens (i.e., the contact sensor is no longer in contact the object), then the power to the drive motor 226 may be restored.

This may be accomplished by including the contact sensor in series with the power to the drive motor 226 or through an arrangement with one or more electrical component electrically coupled to the drive motor 226. In other embodiments, the operation of the drive motor 226 may adjust proportionally to the one or more signals from the one or more sensors. For example, an ultrasonic sensor may generate one or more signals indicating the range of an object from the sensor and as the range increases and/or decreases, the power to the drive motor 226 may increase and/or decrease.

Since the industrial carts are limited to travel along the track 102, the area of track 102 an industrial cart 104 will travel in the future is referred to herein as "in front of the industrial cart" or "leading" and similarly, the area of track 102 an industrial cart 104 has previously traveled is referred to herein as "behind the industrial cart" or "trailing." Further, as used herein "above" refers to the area extending from the industrial cart 104 away from the track 102, which the industrial cart 104 is currently supported by and "below" refers to the area extending from the industrial cart 104 toward the track 102, which the industrial car is currently supported by.

The leading sensor 232 may be coupled to the industrial cart 104 in a position that allows the leading sensor 232 to detect objects, such as another industrial cart 104, or communicate with other sensors coupled on another industrial cart 104 that are in front of or leading the industrial cart 104. The trailing sensor 234 may be coupled to the industrial cart 104 in a position that allows the trailing sensor 234 to detect objects, such as another industrial cart 104, or communicate with other sensors coupled on another industrial cart 104 that are behind or trailing the industrial cart 104. The orthogonal sensor 236 may be coupled to the industrial cart 104 in a position which allows the orthogonal sensor 236 to detect or communication with objects, such as location markers 224 (FIG. 2B), positioned above and/or below the industrial cart 104.

While FIG. 2A depicts the orthogonal sensor 236 positioned generally above the industrial cart 104, as previously stated, the orthogonal sensor 236 may be coupled with the industrial cart 104 in any location which allows the orthogonal sensor 236 to detect and/or communicate with objects, such as a location marker 224, above and/or below the industrial cart 104.

In some embodiments, location markers 224 may be placed along the track 102 or the supporting structures to the track 102 at pre-defined intervals. The orthogonal sensor 236, for example, without limitation, comprises a photo-eye type sensor and may be coupled to the industrial cart 104 such that the photo-eye type sensor may view the location markers 224 positioned along the track 102 below the industrial cart 104. As such, the cart computing device 228 and/or master controller 106 may receive one or more signals generated from the photo-eye in response to detecting a location marker 224 as the industrial cart travels along the track 102. The cart computing device 228 and/or master controller 106, from the one or more signals, may determine the speed of the industrial cart 104.

Additionally, the speed of each of the other industrial carts 104 traveling on the track 102 may also be determined. In some embodiments, in response to determining the speed of one or more of the industrial carts 104 on the track 102, the computing device 228 and/or master controller 106 may generate a control signal or communication signal (e.g., through the track and the wheel of the industrial cart) to the drive motor 226 of the industrial cart 104 to adjust the speed of the drive motor 226. In some embodiments, control of the drive motor 226 may be utilized to maintain a uniform speed among the one or more industrial carts 104 on the track 102 or adjust the distance between one or more of the industrial carts 104 on the track 102.

It should be understood that the leading sensor 232, the trailing sensor 234, and the orthogonal sensor 236 may include one or more of the sensors described herein or one or more other sensors capable of detecting at least the presence of an object (e.g., another industrial cart 104 or a location marker 224, FIG. 2B, e.g., a detected event) and generating one or more signals indicative of the detected event. It should also be understood that the leading sensor 232, the trailing sensor 234, and the orthogonal sensor 236 may include a transmitter and/or transceiver module, such as an infrared emitter or other electromagnetic emitter. In some embodiments, the leading sensor 232b (e.g., of industrial cart 204b in FIG. 2B) may be configured to communicate data with a trailing sensor 234a of a leading cart (e.g. leading cart 204a in FIG. 2B). As such, the leading sensor 232b may include a communications port, as well as sensors to determine a location and/or a relative location of the industrial cart 104 with respect to other carts in the assembly line. The trailing sensor 234b (FIG. 2B) may be configured similar to the leading sensor 232b, except that the trailing sensor 234b is configured to communicate with a trailing cart 204c (FIG. 2C). Additionally, the orthogonal sensor 236 may include an infrared (IR) device and/or other device for facilitating communication with the master controller 106 (FIG. 1).

Referring back to FIG. 2A, it should be understood that while the leading sensor 232 and the trailing sensor 234 are depicted on a leading side and a trailing side of the industrial cart 104, respectively; this is merely an example. Depending on the types of devices utilized, the leading sensor 232 may be located anywhere on the industrial cart 104. Similarly, depending on the types of devices utilized for the trailing sensor 234, these (one or more) devices may be positioned anywhere on the industrial cart 104. While some devices require line of sight, this is not a requirement.

Along similar lines, the orthogonal sensor 236 is depicted in FIG. 2A as being directed substantially upward. This is also merely an example, as the orthogonal sensor 236 may be directed in any appropriate direction to communicate with the master controller 106. Some embodiments may be directed below the industrial cart 104, to the side of the industrial cart 104, and/or may not require line of sight and may be placed anywhere on the industrial cart 104.

FIG. 2B depicts a plurality of industrial carts 204a, 204b, and 204c in an assembly line configuration, according to embodiments described herein. As illustrated, the industrial cart 204b is depicted as being similarly configured as the industrial cart 104 from FIG. 2A. However, in the embodiment of FIG. 2B, the industrial cart 204b is disposed on a track 102. As discussed above, at least a portion of the one or more wheels 222a, 222b, 222c, and 222d (or other portion of the industrial cart 204b) may couple with the track 102 to receive communication signals and/or power. Additionally, the portion of track 102 that is disposed above the industrial cart 204b may be coupled to a watering station 240 and/or a lighting device 242, such that the watering station 240 and/or lighting device 242 may provide light, water, nutrients, etc. to the industrial cart 204b, below.

Also depicted in FIG. 2B are a leading cart 204a and a trailing cart 204c. As the industrial carts 204a, 204b, and 204c are moving along the track 102, the leading sensor 232b and the trailing sensor 234b may detect the trailing cart 204c and the leading cart 204a, respectively, and maintain a predetermined distance from the trailing cart 204c and the leading cart 204a. For example, without limitation, the leading sensor 232b of the industrial cart 204b may detect the distance between the industrial cart 204b and the leading cart 204a (e.g., detected event) and generate one or more signals indicative of the distance. In some embodiments, if the distance between the industrial cart 204b and the leading cart 204a is, for example, without limitation, above a pre-determined value or threshold, e.g., if the pre-determined value is about 12 inches and the distance, as determined by the leading sensor 232b, is about 18 inches, then the speed of the drive motor 226b of industrial cart 204b may be increased to decrease the distance between the industrial cart 204b and the leading cart 204a (e.g., until the distance is about 12 inches or less).

In some embodiments, a distance between the leading cart 204a and the 204b may be defined as a range, (e.g., the range may be defined as from about 8 inches to about 12 inches) For example, if the distance is outside the range (e.g., the distance, as determined by the leading sensor 232b, between the industrial cart 204b and the leading cart 204a is about 18 inches), then the speed of the drive motor 226b of industrial cart 204b may be increased to reduce the distance between the industrial cart 204b and the leading cart 204a (e.g., until the distance is from about 8 inches to about 12 inches).

Similarly, if the distance between the industrial cart 204b and the leading cart 204a is either outside the range (e.g., less than the lower limit of the range) or less than a pre-determined value or threshold, then the drive motor 226b of industrial cart 204b may be adjusted (e.g., the speed decreased) such that the distance between the industrial cart 204b and the leading cart 204a returns to a value within the defined range or is equal to or greater than the pre-determined value.

In some embodiments, the same adjustments may also be applied to the distance between the industrial cart 204b and a trailing cart 204c. In such embodiments, the trailing sensor 234b of industrial cart 204b may determine the distance between the industrial cart 204b and the trailing cart 204c. In response to the one or more signals indicative to the distance between the industrial cart 204b and the trailing cart 204c, the drive motor 226b of the industrial cart 204b may be adjusted (e.g., increased in speed if the distance is above a pre-determined value or above a maximum value in the range or decreased in speed if the distance is below a pre-determined value or below a minimum value in the range).

It should also be understood that the industrial carts 204a, 204b, and 204c may, in some embodiments, utilize the one or more signals from each of their respective leading sensor 232a, 232b, and 232c and/or trailing sensor 234a, 234b, and 234c to determine which drive motor 226a, 226b, and 226c of industrial carts 204a, 204b, and 204c should be adjusted to reduce or increase the distance between each of the industrial carts 204a, 204b, and 204c. For example, if the distance between the leading cart 204a and the industrial cart 204b is less than the pre-determined value and the distance between the industrial cart 204b and the trailing cart 204c is less than the pre-determined value, then the drive motor 226a of the leading cart 204a and the drive motor 226b of the industrial cart 204b may be increased to adjust the distances between each of the carts.

In such embodiments, the industrial carts 204a, 204b, and 204c may communicate their determined distances, (e.g., as determined by their respective leading sensors 232a, 232b, and 232c and trailing sensors 234a, 234b, and 234c) to determine which of the drive motors 226a, 226b, 226c needs to be adjusted. As discussed herein, the one or more signals generated by the leading sensors 232a, 232b, 232c and trailing sensors 234a, 234b, and 234c may be analyzed by the master controller 106 (FIG. 1) or the one or more computing devices 228a, 228b, and 228c. The one or more signals may be transmitted through the track 102 and the one or more wheels 222a, 222b, 222c, and 222d to the master controller 106 (FIG. 1) and/or one or more of the computing devices 228a, 228b, and 228c of industrial carts 204a, 204b, and 204c. In some embodiments, the one or more signals may be transmitted between industrial carts 204a, 204b, and 204c by transmitting and receiving data with the leading sensors 232a, 232b, and 232c and trailing sensors 234a, 234b, and 234c.

While maintaining the distance between the industrial carts 204a, 204b, 204c is contemplated as a use for the leading sensors 232a, 232b, and 232c and trailing sensors 234a, 234b, and 234c, in some instances where the drive motor 226b of the industrial cart 204b malfunctions, the industrial cart 204b may utilize the trailing sensor 234b of industrial cart 204b to communicate with the trailing cart 204c that the industrial cart 204b has malfunctioned. In response to the malfunction, the trailing cart 204c may push the industrial cart 204b. To accommodate the extra load in pushing the industrial cart 204b, the trailing cart 204c may adjust its operation mode (e.g., increase the power to the drive motor 226c) and may begin to push the industrial cart 204b, until the malfunction has been repaired.

In some embodiments, the industrial cart 204b may comprise a slip gear arrangement coupled to the drive motor and the gear system of the track 102 (e.g., the gear system 306 shown in FIG. 3A) such that the industrial cart 204b may be propelled along the track 102. However, when there is a malfunction with industrial cart 204b, for example, when trailing cart 204c engages industrial cart 204b to being pushing, the slip gear allows the gear arrangement which is coupled to the gear system of the track 102 to disengage from the gear system of the track 102. This allows the industrial cart 204b to be freely pushed by the trailing cart 204c. The slip clutch may reengage with the track 102 once the malfunction is corrected and the trailing cart 204c stops pushing.

As will be understood, the leading sensor 232a of the leading cart 204a and the trailing sensor 234c of the trailing cart 204c may be configured to communicate with other industrial carts that are not depicted in FIG. 2B. Similarly, some embodiments may cause the leading sensor 232b to communicate with the trailing sensor 234a of the leading cart 204a to pull the industrial cart 204b in the event of a malfunction. Additionally, some embodiments may cause the industrial carts 204a, 204b, 204c to communicate status and other information, as desired or necessary.

Still referring to FIG. 2B, a location marker 224 is coupled to the track 102. Although the location marker 224 is depicted as being coupled to the underside of the track 102 above the industrial carts 204a, 204b, and 204c, the location marker 224 may be positioned in any location capable of indicating a unique section of the track 102 to the industrial carts 204a, 204b, and 204c.

The location marker 224 may be include a communication portal and may be configured to communicate with the any of the orthogonal sensors 236a, 236b, and 236c. The location marker 224 may comprise an infrared emitter, a bar code, a QR code or other marker capable of indicating a unique location. That is, the location marker 224 may be an active device or a passive device for indicating a location on along the track 102. In some embodiments, the location marker 224 may emit infrared light or visual light at a unique frequency that may be identifiable by the orthogonal sensors 236a, 236b, and 236c.

In some embodiments, the location marker 224 may require line of sight and thus will communicate with the one or more industrial carts 204a, 204b, and 204c that are within that range. Regardless, the respective industrial cart 204a, 204b, 204c may communicate data detected from cart sensors, including the leading sensor 232, the trailing sensor 234, and/or other sensors. Additionally, the master controller 106 may provide data and/or commands for use by the industrial carts 204a, 204b, and 204c via the location marker 224.

In operation, for example, the location marker 224 may designate a unique location along the track 102. As the industrial cart 204b passes in proximity to the location marker 224, the orthogonal sensor 236b may register the unique location (e.g., detect the location marker 224, which is a detected event). By determining the location of the industrial cart 204b along the track 102 from the detected location marker 224 and determining the unique location which the location marker 224 represents, the position of the industrial cart 204b with respect to other industrial carts 204a, 204c may be determined and other functional attributes of the industrial cart 204b may also be determined.

For example, the speed of the industrial cart 204b may be determined based on the time that elapses between two unique locations along the track 102 where the distance between the locations is known. Additionally, through communication with the master controller 106 or with the other industrial carts, distances between the industrial carts 204a, 204b, and 204c may be determined and in response the drive motors 226 may be adjusted as necessary.

While the orthogonal sensors 236a, 236b, and 236c are described herein as devices for detecting the location marker 224, the orthogonal sensors 236a, 236b, and 236c may comprise a transmitting component where data may be transmitted to and received by the location marker 224. For example, the orthogonal sensors 236a, 236b, and 236c may include a near-field communication module and/or an RFID module which is correspondingly registered by the location marker 224 to indicate a unique identification of the industrial cart 204a which is adjacent the location marker 224. However, it should be understood that generally the orthogonal sensors 236a, 236b, and 236c and the location marker 224 operate to identify a location of the industrial carts 204a, 204b, and 204c along the track 102.

FIG. 3A depicts a perspective view of a straight modular track 302 for an industrial cart 104, according to embodiments described herein. The straight modular track 302 is an exemplary modular track that constitutes a portion of the track 102 in FIG. 1. The straight modular track 302 is extended in a lengthwise direction (e.g., +x axis direction). As illustrated in FIG. 3A, the straight modular track 302 may include a plurality of connection mechanisms 304a, 304b, and 304c along a first side line of the straight modular track 302, and a plurality of connection mechanisms 305a, 305b, and 305c along the second side line of the straight modular track 302 such that a plurality of the straight modular track 302 may be coupled together to form the connection portion 102c in FIG. 1.

The first side line and the second side line may be perpendicular to the lengthwise direction (i.e., parallel to the y-axis direction in FIG. 3A). In embodiments, the plurality of connection mechanisms 304a, 304b, and 304c and the plurality of connection mechanisms 305a, 305b, and 305c may be snap-in tabs. While FIG. 3A depicts a plurality of snap-in tabs for connection mechanisms, any other mechanical coupling mechanisms may be used for coupling two or more straight modular track sections 302.

The straight modular track 302 may include two rails 320a and 320b that are extended along the lengthwise direction. In some embodiments, the straight modular track 302 may include more than two rails. The rail 320a may include a groove in which an electrically conductive portion 324a may be placed as shown in an expanded view in FIG. 3A. The rail 320b may include a groove in which an electrically conductive portion 324b may be placed as shown in an expanded view in FIG. 3A. The electrically conductive portions 324a and 324b may be extended along the lengthwise direction and periodically be segmented with a non-conductive section such that a first electrically conductive portion of the track 102 is electrically isolated from a second electrically conductive portion of the track 102 that is placed adjacent to the first electrically conductive portion.

The straight modular track 302 also includes a gear system 306. The gear system 306 may include a plurality of teeth that are configured to engage with a slip gear (or other type of gear configuration) of the industrial cart 104 for propelling the industrial cart 104 along the track 102. In embodiments, the gear system 306 may be positioned proximate to the rail 320b and be extended along the rail 320b. The gear system 306 may be extended along the rail 320b throughout the track 102. In some embodiments, more than one gear system may be provided. For example, one gear system is provided proximate to the rail 320b and another gear system is provided proximate to the rail 320a.

The straight modular track 302 also includes reservoir sections 308a and 308b. The reservoir sections 308a and 308b may be configured to receive water and other runoff and direct the liquid to a predetermined reservoir for recycling, reuse, and/or disposal. In some embodiments, the reservoir sections 308a and 308b receive shavings from the track 102 that result from friction with the straight modular track 302.

While in some embodiments, the reservoir sections 308a and 308b may be angled on the track 102 to allow gravity to direct the liquid or shavings to the predetermined destination, some embodiments may use vibration, and/or include a conveyor system to direct liquid to the predetermined destination. For example, a vibrating device may be attached to the reservoir sections 308a and 308b to direct liquid or shavings to the predetermined destination. As another example, a conveyor belt may be installed along the reservoir sections 308a and 308b to direct liquid or shavings to the predetermined destination.

In some embodiments, location markers 224 may be placed along the straight modular track 302 or the supporting structures to the track at pre-defined intervals. The orthogonal sensor 236 of the industrial cart 104, for example, without limitation, comprises a photo-eye type sensor and may be coupled to the industrial cart 104 such that the photo-eye type sensor may view the location markers 224 positioned along the track 102 below the industrial cart 104.

FIG. 3B depicts a perspective view of a curved modular track 303 for an industrial cart 104, according to embodiments described herein. The curved modular track 303 is an exemplary portion of the track 102 in FIG. 1. Similar to the straight modular track 302, the curved modular track 303 may include a plurality of connection mechanisms 304a, 304b, and 304c on one side of the curved modular track 303, and a plurality of connection mechanisms 305a, 305b, and 305c on the other side of the curved modular track 303 such that a plurality of the curved modular track sections 303 may be coupled together to form the ascending portion 102a or the descending portion 102b shown in FIG. 1.

The curved modular track 303 may include two rails 320a and 320b that are extended along the both sides of the curved modular track 303. The rail 320a is extended along the inner curved side of the curved modular track 303 and the rail 320b is extended along the outer curved side of the curved modular track 303 as shown in FIG. 3B. The rail 320a and the rail 320b may have the same radius of curvature such that the width of the curved modular track 303 is constant. In some embodiments, the straight modular track 302 may include more than two rails. The rail 320a may include a groove in which an electrically conductive portion 324a may be placed similar to the straight modular track 302 in FIG. 3A.

The curved modular track 303 also includes a gear system 306. The gear system 306 may include a plurality of teeth that are configured to engage with a slip gear (or other type of gear configuration) of the industrial cart 104 for propelling the industrial cart 104 along the track 102. In embodiments, the gear system 306 may be positioned proximate to the rail 320b and be extended along the rail 320b. That is, the gear system 306 may be extended to have the same (or similar) radius of curvature as the rail 320b. The gear system 306 may be extended along the rail 320b throughout the track 102. In some embodiments, more than one gear system may be provided on the curved modular track 103. For example, one gear system is provided proximate to the rail 320b and another gear system is provided proximate to the rail 320a.

The curved modular track 303 also includes reservoir sections 308a and 308b. The reservoir sections 308a and 308b may be configured to receive water and other runoff and direct the liquid to a predetermined area for recycling, reuse, and/or disposal. While in some embodiments, the reservoir sections 308a and 308b may be angled on the track 102 to allow gravity to direct the liquid to the predetermined destination, some embodiments may use vibration, and/or include a conveyor system to direct liquid to the predetermined destination. In some embodiments, the reservoir sections 308a and 308b receive shavings from the track 102 that result from friction with the curved modular track 303. A conveyor system or other mechanism may be used to direct the shavings to a predetermined destination.

In some embodiments, location markers 224 may be placed along the curved modular track 303 or the supporting structures to the track at pre-defined intervals. The orthogonal sensor 236 of the industrial cart 104, for example, comprises a photo-eye type sensor and may be coupled to the industrial cart 104 such that the photo-eye type sensor may view the location markers 224 positioned along the track 102 below the industrial cart 104.

The structures of the straight modular track 302 and the curved modular track 303 allow a modular configuration of the track 102, based on the desired lengths and direction. In embodiments, the curved modular track 303 may have various radii of curvature to accommodate different curvatures of the track 102. Additionally, as the connection mechanism 304 of FIG. 3 is depicted as including three snap-in tabs, this is also merely one example, as other connectors may be utilized.

Figure 4:
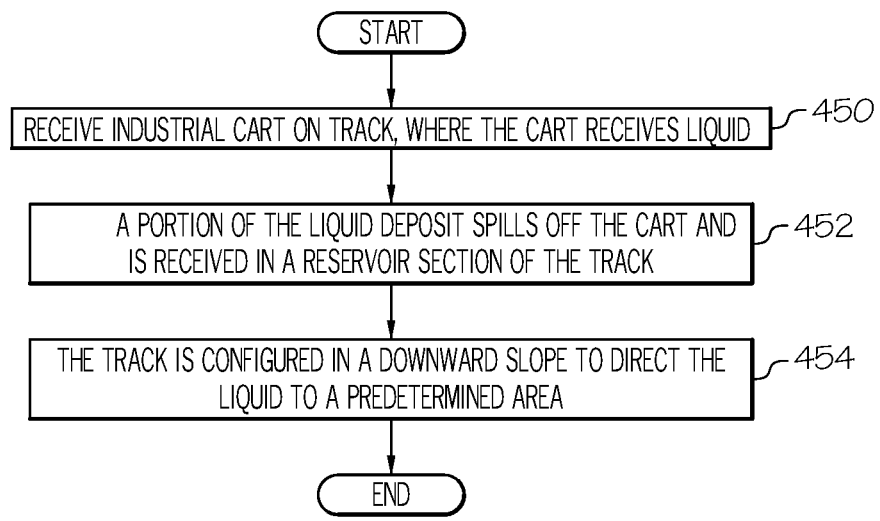
FIG. 4 depicts a flowchart for providing a transportation rail for an industrial cart, according to embodiments described herein.

FIG. 4 depicts a flowchart for providing a transportation rail for an industrial cart 104, according to embodiments described herein. As illustrated in block 450, an industrial cart 104 may be received on a track 102, where the industrial cart 104 receives a liquid deposit. The track 102 may provide power to the industrial cart 104 through the electrically conductive portions 324a and 324b that contact with the wheels 222a, 222b, 222c, and 222d of the industrial cart 104.

In block 452, at least a portion of the liquid deposit spills off the cart and is received in at least one of the reservoir sections 308a and 308b of the track 102. In some embodiments, shavings may spill off the industrial cart 104 and be received in at least one of the reservoir sections 308a and 308b of the track 102. In block 454, the track 102 is configured in a downward slope to direct the liquid to a predetermined area. As discussed above, some embodiments may utilize vibration of the track and/or a conveyor or other mechanism to direct the liquid to the desired destination.

FIG. 5 depicts a computing environment for providing a transportation rail for an industrial cart 104, according to embodiments described herein. As illustrated, the assembly line grow pod 100 may include a master controller 106, which may include a computing device 130. The computing device 130 may include a memory component 540, which stores communications logic 544a and power logic 544b. The communications logic 544a may facilitate communication between the master controller 106 and an industrial cart 104 and/or among industrial carts 104. The power logic 544b may be configured to provide power to one or more of the industrial carts 104 through the electrically conductive portions 324a and 324b. The track 102 may include a plurality of the electrically conductive portions 324a which are periodically segmented with a non-conductive section such that the power logic 544b may control providing power to the plurality of conductive portions 324a independently. Similarly, the track 102 may include a plurality of the electrically conductive portions 324b which are periodically segmented with a non-conductive section such that the power logic 544b may control providing power to the plurality of conductive portions 324b independently.

In some embodiments, the power logic 544b may be configured to activate a vibration component, a conveyor component and/or other hardware either automatically in response to sensing liquid or shavings on the reservoir sections 308a and 308b, and/or manually in response to user input.

The memory component 540 may be configured as volatile and/or nonvolatile memory and may comprise RAM (e.g., including SRAM, DRAM, and/or other types of RAM), ROM, flash memories, hard drives, secure digital (SD) memory, registers, compact discs (CD), digital versatile discs (DVD), or any non-transitory memory device capable of storing machine-readable instructions such that the machine-readable instructions can be accessed and executed by the processor 630. Depending on the particular embodiment, these non-transitory computer-readable mediums may reside within the computing device 130 and/or external to the computing device 130.

The machine-readable instruction set may comprise logic or algorithm(s) written in any programming language of any generation (e.g., 1GL, 2GL, 3GL, 4GL, or 5GL) such as, for example, machine language that may be directly executed by the processor 630 (FIG. 6), or assembly language, object-oriented programming (OOP), scripting languages, microcode, etc., that may be compiled or assembled into machine readable instructions and stored in the non-transitory computer readable memory, e.g., the memory component 540.

In some embodiments, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any computer programming language, as pre-programmed hardware elements, or as a combination of hardware and software components. While the embodiment depicted in FIG. 5 includes a single non-transitory computer readable memory, e.g. memory component 540, other embodiments may include more than one memory module.

Additionally, the assembly line grow pod 100 is coupled to a network 550. The network 550 may include the internet or other wide area network, a local network, such as a local area network, a near field network, such as Bluetooth or a near field communication (NFC) network. In some embodiments, the network 550 is a personal area network that utilizes Bluetooth technology to communicatively couple a user computing device 552, a remote computing device 554, one or more industrial carts 104, the master controller 106, and/or any other network connectable device. In other embodiments, the network 550 may include one or more computer networks (e.g., a personal area network, a local area network, or a wide area network), cellular networks, satellite networks and/or a global positioning system and combinations thereof. Accordingly, at least the one or more industrial carts 104 may be communicatively coupled to the network 550 via the electrically conductive track 102, via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The user computing device 552 may include a personal computer, laptop, mobile device, tablet, server, etc. and may be utilized as an interface with a user. As an example, a user may send a recipe to the computing device 130 for implementation by the assembly line grow pod 100. Another example may include the assembly line grow pod 100 sending notifications to a user of the user computing device 552.

Similarly, the remote computing device 554 may include a server, personal computer, tablet, mobile device, etc. and may be utilized for machine to machine communications. As an example, if the assembly line grow pod 100 determines a type of seed being used (and/or other information, such as ambient conditions), the computing device 130 may communicate with the remote computing device 554 to retrieve a previously stored recipe for those conditions. As such, some embodiments may utilize an application program interface (API) to facilitate this or other computer-to-computer communications.

Figure 6:
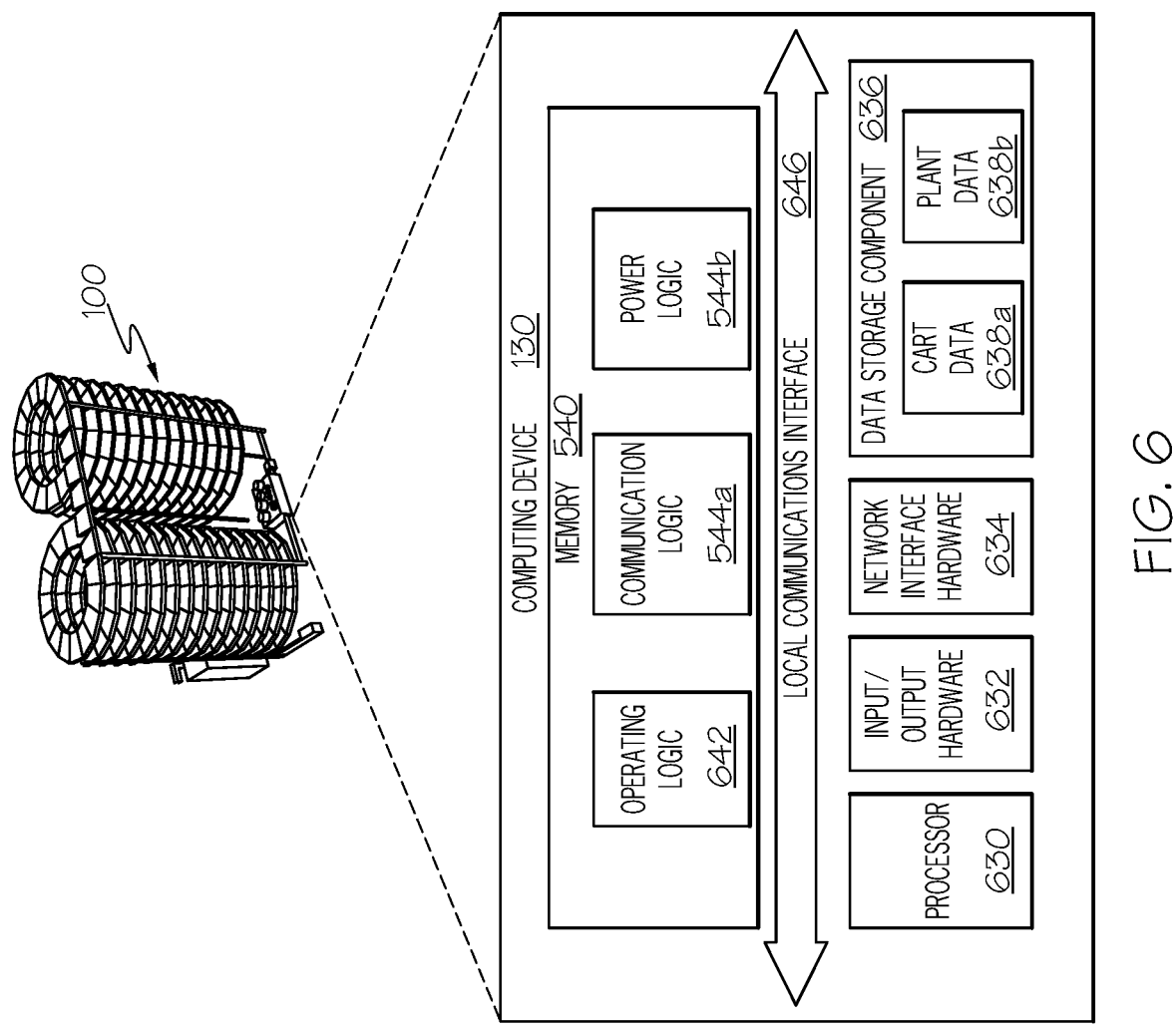
FIG. 6 depicts a computing device for providing a transportation rail for an industrial cart, according to embodiments described herein.

FIG. 6 depicts a computing device 130 for providing a transportation rail for an industrial cart 104, according to embodiments described herein. As illustrated, the computing device 130 includes a processor 630, input/output hardware 632, the network interface hardware 634, a data storage component 636 (which stores systems data 638a, plant data 638b, and/or other data), and the memory component 540. The memory component 540 may store operating logic 642, the communications logic 544a, and the power logic 544b. The communications logic 544a and the power logic 544b may each include a plurality of different pieces of logic, each of which may be embodied as a computer program, firmware, and/or hardware, as an example. A local communication interface 646 is also included in FIG. 6 and may be implemented as a bus or other communication interface to facilitate communication among the components of the computing device 130.

The processor 630 may include any processing component operable to receive and execute instructions (such as from a data storage component 636 and/or the memory component 540). The processor 630 may be any device capable of executing the machine-readable instruction set stored in the memory component 540. Accordingly, the processor 630 may be an electric controller, an integrated circuit, a microchip, a computer, or any other computing device. The processor 630 is communicatively coupled to the other components of the assembly line grow pod 100 by a communication path and/or a local communications interface 646. The communication path and/or the local communications interface 646 may communicatively couple any number of processors 630 with one another, and allow the components coupled to the communication path and/or the local communications interface 646 to operate in a distributed computing environment. Specifically, each of the components may operate as a node that may send and/or receive data. While the embodiment depicted in FIG. 6 includes a single processor 630, other embodiments may include more than one processor 630.

The input/output hardware 632 may include and/or be configured to interface with microphones, speakers, a display, and/or other hardware. The network interface hardware 634 may be any device capable of transmitting and/or receiving data via a network 550. Accordingly, network interface hardware 634 can include a communication transceiver for sending and/or receiving any wired or wireless communication. For example, the network interface hardware 634 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, near-field communication hardware, satellite communication hardware and/or any wired or wireless hardware for communicating with other networks and/or devices.

In one embodiment, network interface hardware 634 includes hardware configured to operate in accordance with the Bluetooth wireless communication protocol. In another embodiment, network interface hardware 634 may include a Bluetooth send/receive module for sending and receiving Bluetooth communications to/from a network 550. The network interface hardware 634 may also include a radio frequency identification ("RFID") reader configured to interrogate and read RFID tags. From this connection, communication may be facilitated between the computing device 130 and other computing devices, such as the user computing device 562 and/or remote computing device 564.

The operating logic 642 may include an operating system and/or other software for managing components of the computing device 130. As also discussed above, communications logic 544a and the power logic 544b may reside in the memory component 540 and may be configured to perform the functionality, as described herein.

It should be understood that while the components in FIG. 6 are illustrated as residing within the computing device 130, this is merely an example. In some embodiments, one or more of the components may reside external to the computing device 130. It should also be understood that, while the computing device 130 is illustrated as a single device, this is also merely an example. In some embodiments, the communications logic 544a and the power logic 544b may reside on different computing devices. As an example, one or more of the functionalities and/or components described herein may be provided by the user computing device 562 and/or remote computing device 564.

Additionally, while the computing device 130 is illustrated with the communications logic 544a and the power logic 544b as separate logical components, this is also an example. In some embodiments, a single piece of logic (and/or or several linked modules) may cause the computing device 130 to provide the described functionality.

As illustrated above, various embodiments for providing a track for an industrial cart are disclosed. These embodiments may allow for proper drainage of liquid waste, as well as a collection area for solid waste, such as cart shavings.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for providing a track for an industrial cart. It should also be understood that these embodiments are merely exemplary and are not intended to limit the scope of this disclosure.

What is claimed is:

1. A track system for a cart, comprising:
a plurality of curved modular track sections for the cart, each of the plurality of curved modular track sections comprising:
one or more rails configured to engage with the cart on the track system; and
one or more reservoir sections configured to receive liquid from the cart,
wherein each of the plurality of curved modular track is tilted relative to ground by a predetermined angle such that the one or more reservoir sections are configured to direct the liquid to a predetermined area;
wherein each of the plurality of curved modular track sections comprises electrically conductive portions configured to provide electric power to the cart; and
wherein the electrically conductive portions are configured to extend along the one or more rails.

2. The track system of claim 1, wherein each of the plurality of curved modular track sections comprises a gear system configured to engage with a gear of the cart.

3. The track system of claim 2, wherein the gear system is configured to extend along one of the one or more rails.

4. The track system of claim 1, wherein the electrically conductive portions are periodically segmented with a non-conductive portion.

5. The track system of claim 1, wherein each of the plurality of curved modular track sections comprises a vibrating device.

6. The track system of claim 1, wherein each of the plurality of curved modular track sections comprises connection mechanisms configured to couple with connection mechanisms of another curved modular track.

7. The track system of claim 6, wherein the connection mechanisms include snap-in tabs.

8. The track system of claim 1, wherein a first set of the plurality of curved modular track sections are coupled to form an ascending portion wrapping around a first axis perpendicular to the ground, and the ascending portion has a predetermined radius of curvature.

9. The track system of claim 8, wherein a second set of the plurality of curved modular track sections are coupled to form a descending portion wrapping around a second axis perpendicular to the ground and parallel to the first axis, and the descending portion has a predetermined radius of curvature.

10. The track system of claim 1, further comprising one or more lighting devices or one or more watering devices.

11. The track system of claim 1, further comprising:
a plurality of straight modular track sections, each of the plurality of curved modular track sections comprising:
one or more rails configured to engage with the cart on the track; and
one or more reservoir sections configured to receive liquid from the cart.

12. The track system of claim 1, wherein each of the plurality of curved modular track sections includes one or more location markers.

13. The track system of claim 1, wherein one or more reservoir sections are positioned proximate to the one or more rails.

14. A method for providing a track for a cart, the method comprising:
providing the track for the cart by coupling a plurality of curved modular track sections;
engaging one or more rails of the track with the cart;
receiving, by one or more reservoir sections of the track, liquid from the cart; and
directing the liquid to a predetermined area,
wherein each of the plurality of curved modular track is tilted relative to ground by a predetermined angle such that the one or more reservoir sections are configured to direct the liquid to a predetermined area;
wherein each of the plurality of curved modular track sections comprises electrically conductive portions configured to provide electric power to the cart; and
wherein the electrically conductive portions are configured to extend along the one or more rails.

15. The method of claim 14, wherein a first set of the plurality of curved modular track sections are coupled to form an ascending portion wrapping around a first axis perpendicular to the ground, and the ascending portion has a predetermined radius of curvature.

16. The method of claim 15, wherein a second set of the plurality of curved modular track sections are coupled to form a descending portion wrapping around a second axis perpendicular to the ground and parallel to the first axis, and the descending portion has a predetermined radius of curvature.

17. The method of claim 14, wherein each of the plurality of curved modular track sections comprises a vibrating device.

18. A track system for a cart, the track system comprising:
a plurality of modular track sections, each of the modular track sections comprising:
one or more rails configured to engage with the cart;
a gear system configured to engage with a gear of the cart; and
connection mechanisms configured to couple with connection mechanisms of another modular track section,
wherein at least one of the plurality of modular track sections is tilted relative to ground by a predetermined angle;
wherein each of the modular track sections includes one or more reservoir sections configured to receive liquid from the cart, and
wherein the one or more reservoir sections include a vibration device.

* * * * *